(12) United States Patent
Lee et al.

(10) Patent No.: US 10,895,891 B1
(45) Date of Patent: Jan. 19, 2021

(54) ELECTRICAL ASSEMBLY WITH A REMOVABLE DOCKING SLED

(71) Applicant: COMARK, LLC, Milford, MA (US)

(72) Inventors: Jason Lee, New Taipei (TW); M. D. Hsu, New Taipei (TW); Dean Miller, New Taipei (TW)

(73) Assignee: Comark, LLC, Milford, MA (US)

( * ) Notice: Subject to any disclaimer, the term of this patent is extended or adjusted under 35 U.S.C. 154(b) by 0 days.

(21) Appl. No.: 16/587,420

(22) Filed: Sep. 30, 2019

(51) Int. Cl.
*G06F 1/16* (2006.01)

(52) U.S. Cl.
CPC .......... *G06F 1/1632* (2013.01); *G06F 1/1683* (2013.01)

(58) Field of Classification Search
CPC ........................................................ H05K 5/00
See application file for complete search history.

(56) References Cited

U.S. PATENT DOCUMENTS

| 2004/0233620 | A1* | 11/2004 | Doczy | ................... | G06F 1/1669 |
| | | | | | 361/679.15 |
| 2010/0013431 | A1* | 1/2010 | Liu | ........................ | H02J 50/10 |
| | | | | | 320/108 |

FOREIGN PATENT DOCUMENTS

| KR | 20130073651 A | 7/2013 |
| TW | 201610645 A | 3/2016 |

OTHER PUBLICATIONS

TW Office Action issued by the IPO dated Sep. 23, 2020 for corresponding TW Application No. 108135600 with English translation.

* cited by examiner

*Primary Examiner* — Jerry Wu

(74) *Attorney, Agent, or Firm* — Martin & Ferraro, LLP

(57) ABSTRACT

A tablet computer with a docking sled type arrangement including a payment device of choice is provided. The docking sled can be removed from the tablet computer to provide protection to the payment device. The docking sled employs magnetic force to hold and compress electronic contacts. These contacts provide charging power to the docking sled and bi-directional communication. The docking can be oriented left or right to accommodate both left handed and right handed users.

15 Claims, 6 Drawing Sheets

ELECTRICAL ASSEMBLY WITH A REMOVABLE DOCKING SLED

FIELD OF THE INVENTION

The present invention relates to an electrical assembly with a removable docking sled. In particular, the present invention relates to an electrical assembly including a main body and a docketing sled removably attached to the main body, for example, to a computer.

BACKGROUND

Mobile devices play an important role in human daily life for the convenience they provide. Among different kinds of mobile devices, mobile payment devices facilitate patrons' payments when purchasing goods. Conventional mobile payment devices required a USB connection or earphone jack for communication with a main body, such as a computer, cash register, etc. and for charging. This type of payment device has since evolved to use wireless communication while still requiring a USB port or contact for charging. These wireless communication payment devices require a direct connection or disconnection from a docking sled which is traditionally fixed to a tablet computer. The payment device would have to break electrical contact from the docking sled and slide up and down or sideways to then be handed to a patron. This action often requires two hands and more than one motion (i.e., removing/sliding it from the sled and turning it so that it faces the patron). The device at this point is completely exposed to the environment. There are other types of wireless communication payment device docking sleds which are completely removable from the tablet computer, but these docking sleds do not provide contact charging or communication when connected to the tablet computer.

SUMMARY OF THE INVENTION

The present invention allows the user to remove the entire docking sled containing the payment device from the tablet computer in a single motion. Conversely, it can be connected to the tablet computer in a single motion, at which point the contacts of the docketing sled and the tablet computer can be aligned with each other automatically due to magnetic polar alignment. This can be done by orienting the docketing sled left or right with either the right or left hand. When the docking sled is connected to the tablet computer, charging power is applied to the docking sled and bi-directional communication therebetween is enabled. Since the docking sled contains the payment device, the charging power is then supplied to the payment device and there is also bi-directional communication between the docking sled and the payment device. When removed from the tablet computer, the docking sled breaks the electrical contacts with the tablet computer (not its connection with the payment device itself), and provides electrical protection to the payment device by serving as a buffer. The docking sled also provides protection from the environment and deters tampering with the payment device.

In accordance with a first aspect of the present invention, an electrical assembly with a removable docking sled is provided that comprises a main body having a side, and at least one electrical connecting portion provided on the side of the main body; the docking sled is hollow and has an opening, a first side and a second side opposite the first side, the second side of the docking sled being removably attached to the side of the main body by means of an attachment means or attachment element and having an electrical connecting portion electrically connected to the at least one electrical connecting portion during attachment; wherein when the electrical connecting portion of the docking sled is electrically connected to the at least one electrical connecting portion, the docking sled is oriented in at least one orientation with respect to the main body.

In accordance with a second aspect of the present invention, the electrical assembly with a removable docking sled according to the first aspect is configured so that the at least one electrical connecting portion includes a first electrical connecting portion and a second electrical connecting portion; and the electrical connecting portion of the docking sled is a third electrical connecting portion electrically connected to one of the first electrical connecting portion and the second electrical connecting portion during attachment of the docking sled to the main body.

In accordance with a third aspect of the present invention, the electrical assembly with a removable docking sled according to the second aspect is configured so that the side of the main body has a mount plate and the first electrical connecting portion and the second electrical connecting portion are provided on the mount plate.

In accordance with a fourth aspect of the present invention, the electrical assembly with a removable docking sled according to the third aspect is configured so that the first electrical connecting portion and the second electrical connecting portion are spaced from and opposite to each other substantially along a lengthwise direction of the mount plate.

In accordance with a fifth aspect of the present invention, the electrical assembly with a removable docking sled according to the fourth aspect is configured so that the first electrical connecting portion and the second electrical connecting portion are unidirectional.

In accordance with a sixth aspect of the present invention, the electrical assembly with a removable docking sled according to the first aspect is configured so that the main body is a tablet computer.

In accordance with a seventh aspect of the present invention, the electrical assembly with a removable docking sled according to the fifth aspect is configured so that the first electrical connecting portion and the second electrical connecting portion are connected to the same electrical circuits within the main body.

In accordance with an eighth aspect of the present invention, the electrical assembly with a removable docking sled according to the sixth aspect is configured so that when the third electrical connecting portion is connected to the second electrical connecting portion, the docking sled is oriented in a first orientation with respect to the tablet computer, and when the third electrical connecting portion is connected to the first electrical connecting portion, the docking sled is oriented in a second orientation with respect to the tablet computer.

In accordance with a ninth aspect of the present invention, the so electrical assembly with a removable docking sled according to the eighth aspect is configured so that the second orientation is at an angle with respect to the first orientation.

In accordance with a tenth aspect of the present invention, the electrical assembly with a removable docking sled according to the sixth aspect is configured so that the attachment element includes at least one first magnet on one of the mount plate of the tablet computer and the second side of the docking sled, and at least one metal piece on the other one of the mount plate of the tablet computer and the second side of the docking sled, wherein the first magnet and the metal piece correspond to each other.

In accordance with an eleventh aspect of the present invention, the electrical assembly with a removable docking sled according to the sixth aspect is configured so that the attachment element includes at least one first magnet on one of the mount plate of the tablet computer and the second side of the docking sled, and at least one second magnet on the other one of the mount plate of the tablet computer and the second side of the docking sled, wherein the first magnet and the second magnet correspond to each other and have opposite poles.

In accordance with a twelfth aspect of the present invention, the electrical assembly with a removable docking sled according to the ninth aspect is configured so that the angle is about 180°.

In accordance with a thirteenth aspect of the present invention, the electrical assembly with a removable docking sled according to the first aspect is configured so that when the docking sled is electrically connected to the main body, the main body provides charging power to the docking sled and there is bi-directional communication between the docking sled and the main body.

In accordance with a fourteenth aspect of the present invention, the electrical assembly with a removable docking sled according to the first aspect further comprises a mobile device removably received within the docking sled from the opening of the docking sled and electrically connected to the docking sled when the mobile device is received within the docking sled.

In accordance with a fifteenth aspect of the present invention, the electrical assembly with a removable docking sled according to the fourteenth aspect is configured so that the mobile device is a payment device.

In accordance with a sixteenth aspect of the present invention, the electrical assembly with a removable docking sled according to the fourteenth aspect is configured so that when the mobile device is electrically connected to the docking sled, the docking sled provides charging power to the mobile device and there is bi-directional communication between the docking sled and the mobile device.

In accordance with a seventeenth aspect of the present invention, the electrical assembly with a removable docking sled according to the fourteenth aspect is configured so that the docking sled is provided with a guide for guiding the mobile device to be received within the docking sled.

In accordance with an eighteenth aspect of the present invention, the electrical assembly with a removable docking sled according to the seventeenth aspect is configured so that the guide of the docking sled comprises two opposite rails and an end wall interconnecting a distal end of each rail to form the opening for the mobile device to be inserted thereinto and move along the rails until it reaches the end wall.

In accordance with a nineteenth aspect of the present invention, the electrical assembly with a removable docking sled according to the eighteenth aspect is configured so that the intersection of the first side and the end wall of the docking sled is provided with a sled electrical connecting portion facing the opening of the docking sled and an end portion of the mobile device is provided with an end electrical connecting portion so that when the mobile device reaches the end wall, the sled electrical connecting portion of the end wall is electrically connected to the end electrical connecting portion of the mobile device.

In accordance with a twentieth aspect of the present invention, the electrical assembly with a removable docking sled according to the fourteenth aspect is configured so that the first side of the docking sled is open so that the mobile device is accessible from the open first side when it is received within the docking sled.

These and other objects of the present invention will be apparent from review of the following specification and the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. In the drawings.

DESCRIPTION OF THE EMBODIMENTS

Figure 1:
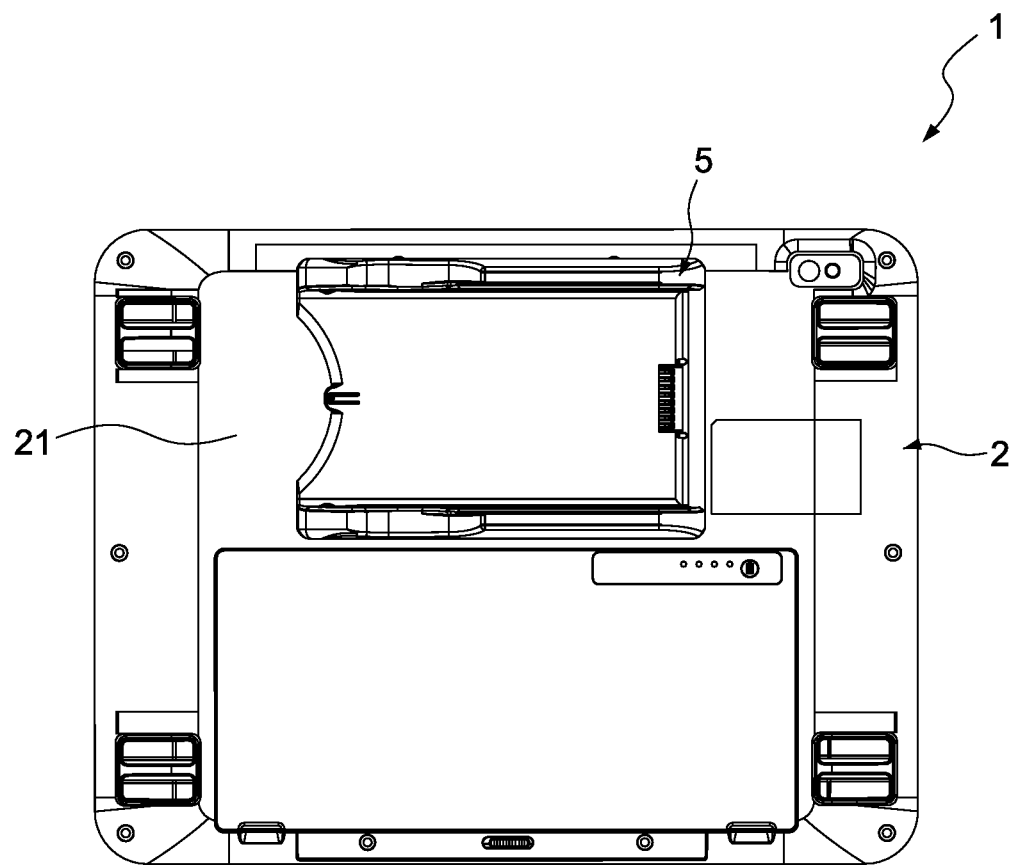
FIG. 1 is a plan view showing a side of an electrical assembly with a removable docking sled in accordance with an embodiment of the present invention, in which the docking sled is oriented in a first orientation.

The detailed description set forth below is intended as a description of various configurations of the present invention and is not intended to represent the only configurations in which the present invention may be practiced. It will be apparent, however, to those of ordinary skill in the art that the present invention is not limited to the specific details set forth herein and may be practiced without these specific details.

The embodiments will now be described with reference to the accompanying drawings, wherein like reference numerals designate corresponding or identical elements throughout the various drawings.

Figure 2:
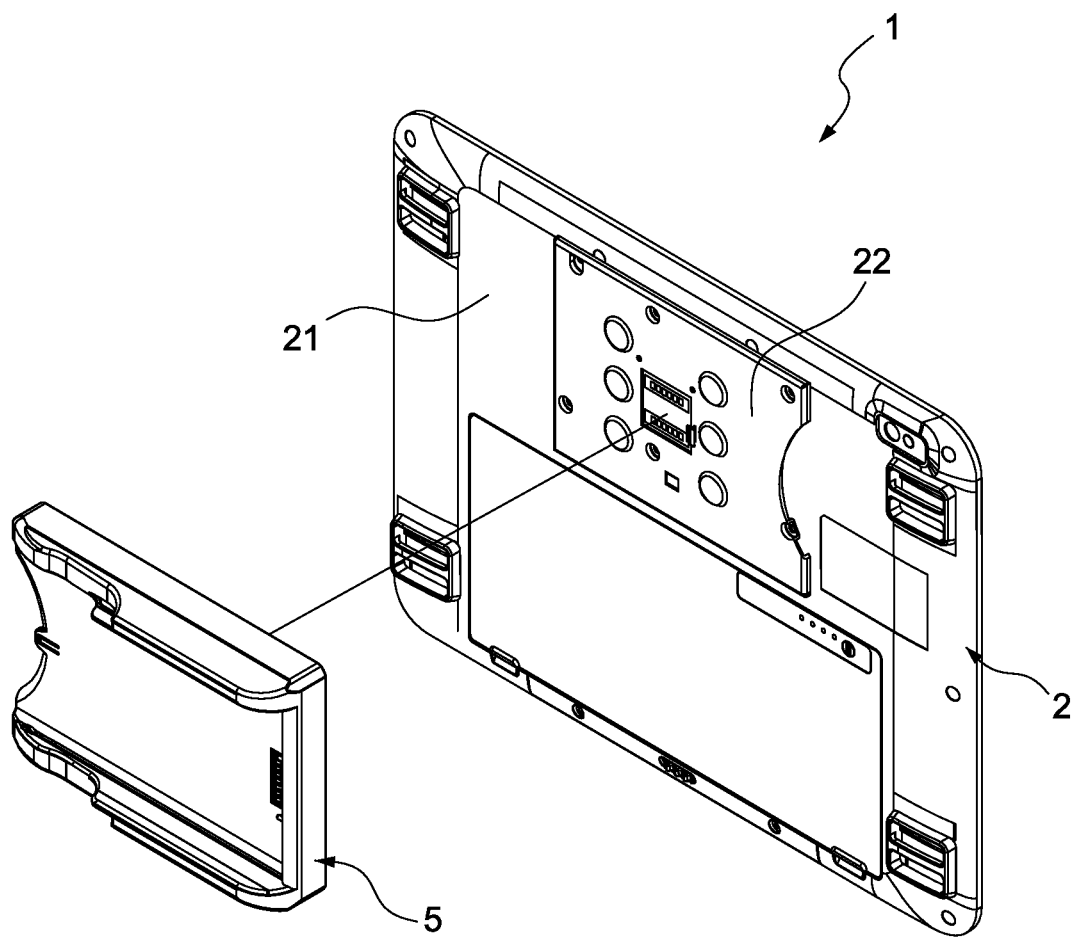
FIG. 2 is an exploded view of the electrical assembly with a removable docking sled illustrated in FIG. 1.

FIGS. 1 and 2 disclose an electrical assembly with a removable docking sled in accordance with an embodiment of the present invention. As shown, the assembly 1 comprises a main body 2 and a docking sled 5 removably attached to the main body 2.

In the present embodiment, the main body 2 is directed to a tablet computer 2 which is in the shape of a substantially rectangular body and has a side 21 (normally, the back side) for the docking sled 5 to be removably attached thereto.

Figure 3:
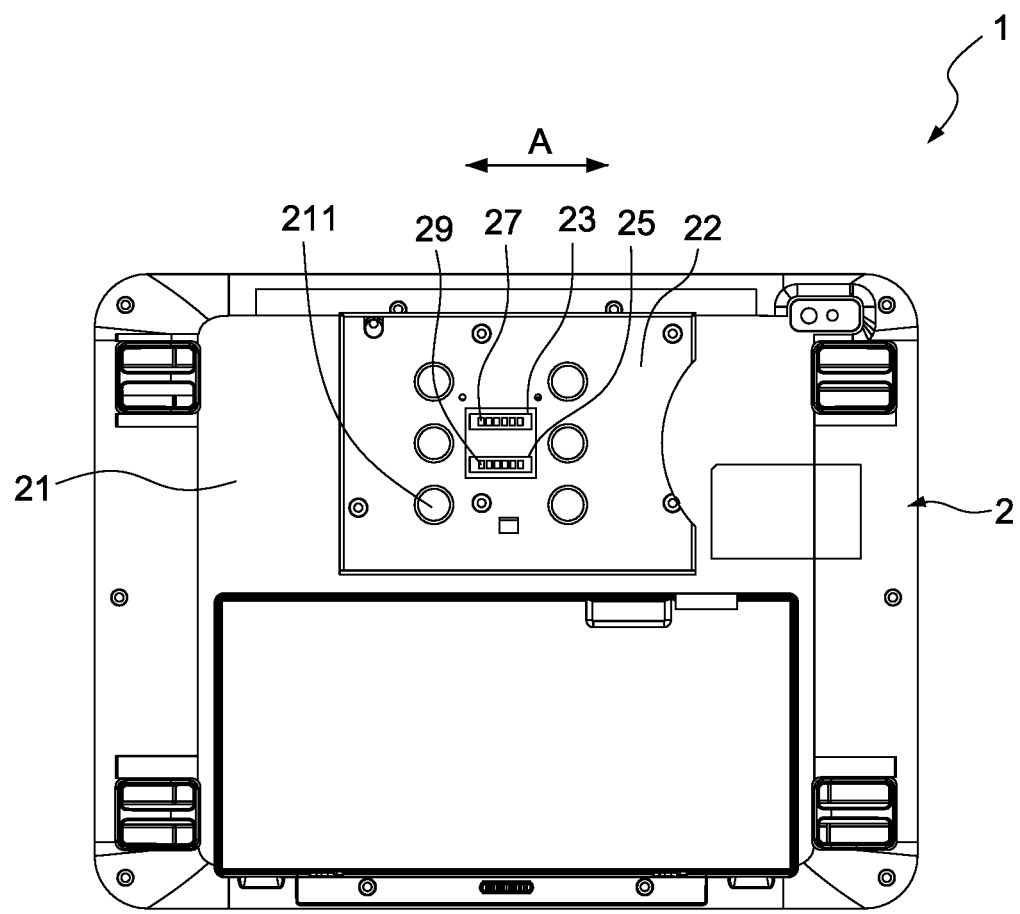
FIG. 3 is a plan view showing a side of a tablet computer of the electrical assembly illustrated in FIG. 1.

FIG. 3 shows the side 21 of the tablet computer 2 without the docking sled 5. As shown in FIG. 3, the side 21 of the tablet computer 2 has a substantially rectangular mount plate 22, on which a first electrical connecting portion 23 and a second electrical connecting portion 25 are provided. The first electrical connecting portion 23 and the second electrical connecting portion 25 are spaced from and opposite to each other substantially along a lengthwise direction A of the mount plate 22.

Preferably, both the first electrical connecting portion 23 and the second electrical connecting portion 25 are unidirectional. In addition, both the first electrical connecting portion 23 and the second electrical connecting portion 25 are connected to the same electrical circuits (not shown) within the tablet computer 2, which perform the functions of power charging and/or bi-communication with the docketing sled 5. In the present embodiment, the first electrical connecting portion 23 has a plurality of contacts 27 arranged in a row parallel to the lengthwise direction A of the mount plate 22. Similarly, the second electrical connecting portion 25 has a plurality of contacts 29 arranged in a row parallel to the lengthwise direction A of the mount plate 22. The row of the contacts 27 of the first electrical connecting portion 23 are the same as the row of the contacts 29 of the second electrical connecting portion 25 but is oriented 180° from the contacts 29 of the second electrical connecting portion 25. In the other embodiments, they can be of other types of electrical connection, such as USB interface.

Figure 4:
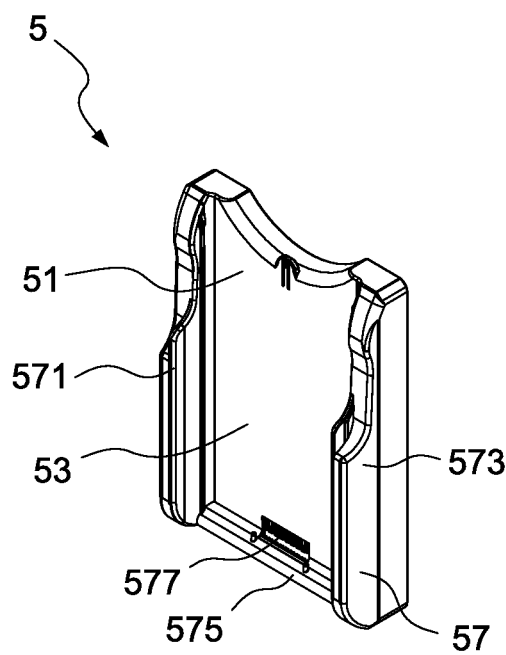
FIG. 4 is a front perspective view of the removable docking sled of the electrical assembly illustrated in FIG. 1.
Figure 5:
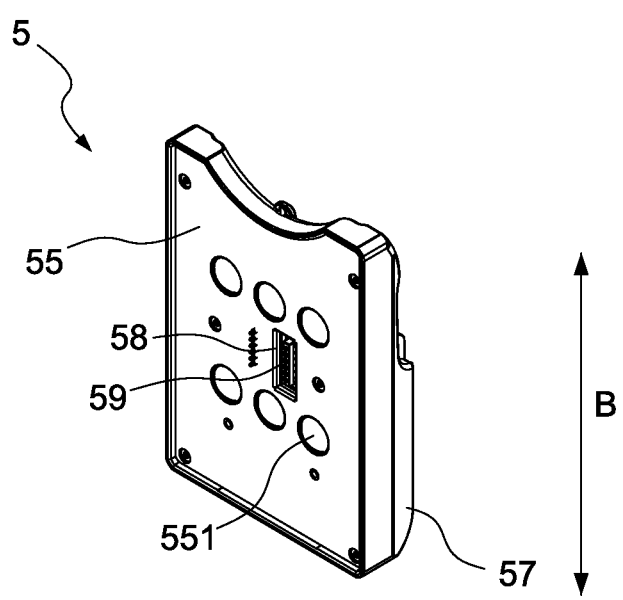
FIG. 5 is a rear perspective view of the removable docking sled illustrated in FIG. 4.

FIGS. 4 and 5 show the front and rear of the docking sled 5, respectively. As shown in FIGS. 4 and 5, the docking sled 5 is in the shape of a substantially rectangular and hollow body and has an opening 51, a first side 53 and a second side 55 opposite the first side 53. The second side 55 of the docking sled 5 is provided with a third electrical connecting portion 58, which, in the current embodiment, has electrical circuits therein (not shown in figures) with a plurality of contacts 59 arranged in a row parallel to a lengthwise direction B of the docking sled 5.

The second side 55 of the docking sled 5 is removably attached to the mount plate 22 of the tablet computer 2 so that the plurality of contacts 59 of the third electrical connecting portion 58 correspond to the plurality of contacts 27 and the plurality of contacts 29 on the mount plate 22, and electrically connects either of the plurality of contacts 27 and the plurality of contacts 29 during attachment between the docking sled 5 and the mount plate 22. Based on the above configuration, the docking sled 5 is electrically connected to the tablet computer 2 during attachment, the tablet computer 2 provides charging power to the docking sled 5 and there is bi-directional communication between the docking sled 5 and the tablet computer 2.

To removably attach the docking sled 5 to the tablet computer 2, an attachment element is provided. As shown in FIGS. 3 and 5, in the current embodiment, the attachment element includes a plurality of first magnets 211 (in this case, six first magnets 211) arranged in two parallel rows on the mount plate 22 of the tablet computer 2 and a plurality of second magnets 551 (in this case, six second magnets 551, with poles opposite those of first magnets 221) arranged in two parallel rows on the second side 55 of the docking sled 5. The two rows of the magnets 211 are oriented in a direction orthogonal to the lengthwise direction A of the mount plate 22. Further, the two rows of the second magnets 551 are oriented in a direction orthogonal to the lengthwise direction B of the docking sled 5. The rows of the first and second magnets 211 and 551 correspond to each other so that in addition to the magnetic attachment, the arrangement of the first and second magnets 211 and 551 facilitates the alignment between the docking sled 5 and the mount plate 22.

Due to the orientations of the rows of the first magnets 211 and the second magnets 551, after attachment, the lengthwise direction B of the docking sled 5 is parallel to the lengthwise direction A of the mount plate 22. Moreover, the arrangement of the first and second magnets 211 and 551, in cooperation with that of the first electrical connecting portion 23 and the second electrical connecting portion 25, results in the docking sled 5 being oriented in a first orientation with respect to the tablet computer 2 when the third electrical connecting portion 58 is connected to the second electrical connecting portion 25 (i.e., from the perspective of a viewer facing FIGS. 1, 2 and 6, the opening 51 of the docking sled 5 is oriented to the left). Similarly, as shown in FIG. 7, when the third electrical connecting portion 58 is connected to the first electrical connecting portion 23, the docking sled 5 is oriented in a second orientation which, as shown in FIGS. 1, 2, 6 and 7, is different from and about 180° from the first orientation.

As further shown in FIGS. 3 and 5, the first electrical connecting portion 23 and the second electrical connecting portion 25 are located between the two rows of the first magnets 211, and the third electrical connecting portion 58 is located between the two rows of second magnets 551 so that when the first magnets 211 are attached to the second magnets 551, they hold and compress the contacts 59 of the docking sled 5 against the contacts 27 of the mount plate 22, or the contacts 59 of the docking sled 5 against the contacts 29 of the mount plate 22. Preferably, the magnetic force therebetween can endure (but is not limited to) a weight in the range of 5 lbs to 10 lbs.

It is also feasible that one of the second side 55 of the docking sled 5 and the mount plate 22 of the tablet computer 2 has magnets and the other of the second side 55 of the docking sled 5 and the mount plate 22 of the tablet computer 2 has only metal pieces to achieve the attachment therebetween. Of course, other attachment element, such as hook and loop (Velcro™) fasteners, snap-fitting and the like, are also feasible.

Figure 6:
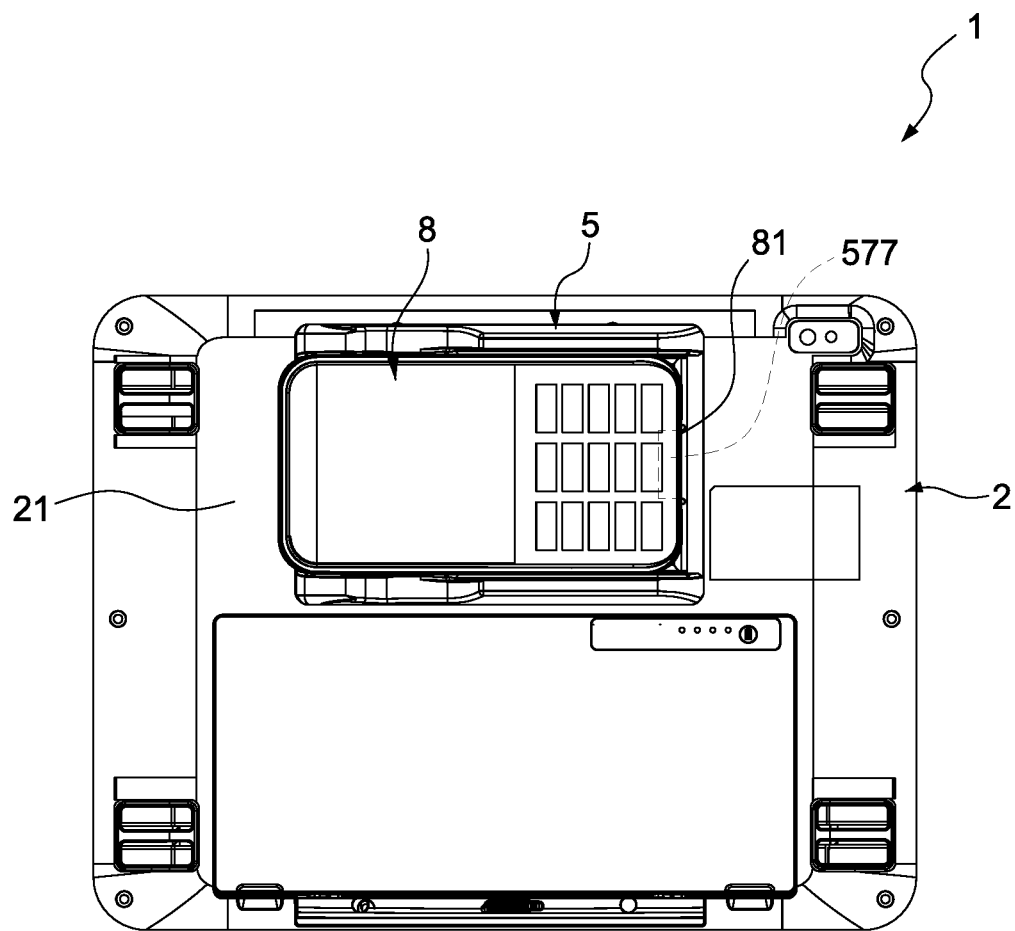
FIG. 6 is a plan view showing the side of the electrical assembly with a removable docking sled illustrated in FIG. 1, in which a payment device is received in the docking sled oriented in a first orientation.
Figure 7:
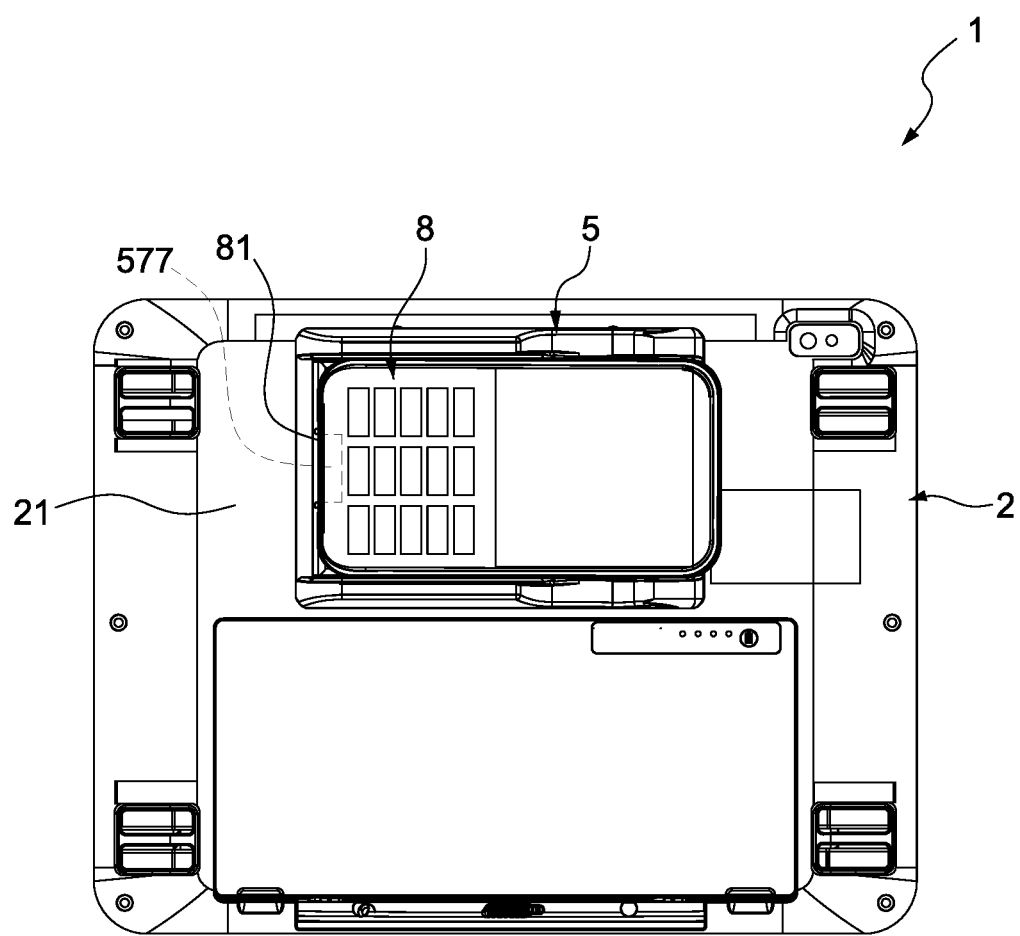
FIG. 7 is a plan view showing a side of the electrical assembly with a removable docking sled illustrated in FIG. 1, in which the payment device is received in the docking sled oriented in a second orientation.

As shown in FIGS. 6 and 7, the docking sled 5 is used to receive a mobile device 8. In the current embodiment, the mobile device 8 is a payment device 8 which allows a user to make payment through, for example, RFID (Radio Frequency Identification) sensing, magnetic strip and/or smart card reader so as to purchase goods. The end portion of the payment device 8 has an end electrical connecting portion or connector 81 including a plurality of contacts (as shown in FIGS. 6 and 7).

To facilitate the insertion of the payment device 8 into the docking sled 5, the docking sled 5 is provided with guide 57 for guiding the payment device 8 to be received within the docking sled 5 smoothly, from the opening 51 of the docking sled 5. The guide 57 comprises two opposite rails 571, 573 and an end wall 575 interconnecting a distal end of each rail 571, 573 to form the opening 51 for the payment device 8. Further, as shown in FIG. 4, the intersection of the first side 53 and the end wall 575 of the docking sled 5 is provided with a sled electrical connecting portion or a connector 577 including a plurality of contacts and facing the opening 51 of the docking sled 5 so that when the end portion of the payment device 8 reaches the end wall 575, the end electrical connecting portion or connector 81 of the payment device 8 is electrically connected to the connector 577 of the end wall 575.

The electrical connection between the connector 577 and connector 81 could be, for example, by means of rocker pins or pogo pins, USB. Further, the position of the connector 577 is not limited to be at the intersection of the first side 53 and the end wall 575 of the docking sled 5, and the position of the connector 81 is not limited to be at the end portion of the payment device 8. As long as the connector 577 can electrically connect to the connector 81 when the payment device 8 is received within the docking sled 5, they can be arranged at any positions as desired.

The connector 577 is electrically connected to the electrical circuits (not shown) within the docking sled 5, which connect the third electrical connecting portion 58. Accordingly, when the docking sled 5 is attached to the mount plate 22 of the tablet computer 2 and the payment device 8 is received in the docking sled 5, the docking sled 5 provides charging power to the payment device 8 through the connection between either the first or second electrical connecting portion 23, 25 of the tablet computer 2 and the third electrical connecting portion 58 of the docking sled 5, and the connection between the connector 577 of the docking sled 5 and the connector 81 of the payment device 8. Moreover, there is also bi-directional communication between the docking sled 5 and the payment device 8.

In addition, in the current embodiment, the first side 53 of the docking sled 5 is open so that the payment device 8 is still accessible from the open first side 53 of the docking sled 5 when it is received within the docking sled 5.

Based on the above structure, the payment device 8 is received within the docking sled 5 and the docking sled 5 is attached to the tablet computer 2. Since there is bi-directional communication between the tablet computer 2 and the docking sled 5 and between the docking sled 5 and the payment device 8, the payment information can be transmitted from the payment device 8 to the tablet computer 2 and the goods and stock information can be transmitted from the tablet computer 2 to the payment device 8. Nevertheless, there is wireless communication between the payment device 8 and the tablet computer 2 so that even if the payment device 8 with the docking sled 5 is removed from the tablet computer 2, the payment, goods and stock information can still be exchanged with the tablet computer 2.

When a user intends to remove the payment device 8 from the tablet computer 2, the payment device 8 can be removed together with the docking sled 5 so that the payment device 8 is still protected by the docking sled 5.

Moreover, as shown in FIG. 6, due to the arrangement of the first and second magnets 221, 551 and the electrical connecting portions 23, 25 and 58 stated above, when the third electrical connecting portion 58 is connected to the second electrical connecting portion 25, the docking sled 5 is oriented in the first orientation (i.e., the opening 51 of the docking sled 5 and the top of the payment device 8 face the left side of the tablet computer 2) so that the payment device 8 with the docking sled 5 may be easily operated by a right-handed user. Similarly, as shown in FIG. 7, when the third electrical connecting portion 58 is connected to the first electrical connecting portion 23, the docking sled 5 is oriented in the second orientation, which, as shown in FIGS. 6 and 7, is about 180° from the first orientation, so that the payment device 8 with the docking sled 5 may be easily operated by a left-handed user. With this configuration, it is possible for the user to use only one hand to detach the payment device 8 with the docking sled 5 from the tablet computer 2 and directly hand it to a patron for making payment without sliding the payment device 8 from the docking sled 5 or turning the payment device 8.

Even though in the current embodiment, the second orientation is about 180° from the first orientation, in other embodiments, the second orientation can be at any angle with respect to the first orientation. Namely, the first electrical connecting portion 23 and the second electrical connecting portion 25 are not parallel to each other.

In some embodiments, the mount plate 22 is formed integrally with the side 21 of the tablet computer 2. In other embodiments, the mount plate 22 can be omitted and thus the first electrical connecting portion 23, the second electrical connecting portion 25 and the first magnets 221 are directly provided on the side 21 of the tablet computer 2.

In other embodiments, the mount plate 22 may have only one electrical connecting portion which is bi-directional, and thus the docking sled 5 can be attached to the tablet computer 2 when it is oriented in the first orientation or the second orientation. Moreover, in other embodiments, the main body 2 can be a laptop computer, a cash register, etc. and the mobile device can be a mobile phone, a GPS device, a handheld transceiver, etc.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, and do not have any other meaning, for example, a particular order or the like. Moreover, the term "first element" itself, for example, does not imply existence of a "second element," and the term "second element" itself does not imply existence of a "first element."

Finally, terms of degree such as "substantially," "about" and "approximately" as used herein mean a reasonable amount of deviation of the modified term such that the end result is not significantly changed. All numerical values described in the present application can be construed as including the terms such as "substantially," "about" and "approximately."

It should be understood that aspects of the embodiments herein generally may be interchanged in whole or in part. The disclosure further includes the individual parts and/or combinations/subassemblies, methods of making the parts, methods of assembling the parts and methods of using the drinking straw, cleaning element, and the storage case.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that, numerous modifications and variations of the present invention are possible in light of the above teachings. It is therefore to be understood that within the scope of the appended claims, the invention may be practiced otherwise than as specifically described herein.

What is claimed is:

1. An electrical assembly, comprising:
   a tablet computer with a main body having a side, and at least one electrical connecting portion provided on the side of the main body; and
   a docking sled being hollow and having a first side and a second side opposite the first side, and an opening formed on the first side and configured to receive a mobile device, the second side of the docking sled being removably attached to the side of the main body by an attachment element and having an electrical connecting portion electrically connected to the at least one electrical connecting portion of the main body during attachment, the docking sled having a guide comprising two opposite rails and an end wall interconnecting a distal end of each rail to form the opening for the mobile device to be inserted thereinto and move along the rails until it reaches the end wall, wherein when the electrical connecting portion of the docking sled is electrically connected to the at least one electrical connecting portion of the main body, and the mobile device is electrically connected to the docking sled when the docking sled is oriented in at least two orientations with respect to the main body, wherein the intersection of the first side and the end wall of the docking sled is provided with a sled electrical connecting portion facing the opening of the docking sled and an end portion of the mobile device is provided with an end electrical connecting portion so that when the mobile device reaches the end wall, the sled electrical connecting portion of the end wall is electrically connected to the end electrical connecting portion of the mobile device.

2. The electrical assembly according to claim 1, wherein the at least one electrical connecting portion of the main body includes a first electrical connecting portion and a second electrical connecting portion; and the electrical connecting portion of the docking sled is a third electrical connecting portion electrically connected to one of the first electrical connecting portion and the second electrical connecting portion during attachment of the docking sled to the main body.

3. The electrical assembly according to claim 2, wherein the side of the main body has a mount plate and the first electrical connecting portion and the second electrical connecting portion are provided on the mount plate.

4. The electrical assembly according to claim 3, wherein the first electrical connecting portion and the second electrical connecting portion are spaced from and opposite to each other substantially along a lengthwise direction of the mount plate.

5. The electrical assembly according to claim 4, wherein the first electrical connecting portion and the second electrical connecting portion are unidirectional.

6. The electrical assembly according to claim 5, wherein the first electrical connecting portion and the second electrical connecting portion are connected to the same electrical circuits within the main body.

7. The electrical assembly according to claim 1, wherein when the third electrical connecting portion is connected to the second electrical connecting portion, the docking sled is oriented in a first orientation with respect to the tablet computer, and when the third electrical connecting portion is connected to the first electrical connecting portion, the docking sled is oriented in a second orientation with respect to the tablet computer.

8. The electrical assembly according to claim 7, wherein the second orientation is at an angle with respect to the first orientation.

9. The electrical assembly according ng to claim 1, wherein the attachment element includes at least one first magnet on one of the mount plate of the tablet computer and the second side of the docking sled, and at least one metal piece on the other one of the mount plate of the tablet computer and the second side of the docking sled, wherein the first magnet and the metal piece correspond to each other.

10. The electrical assembly according to claim 1, wherein the attachment element includes at least one first magnet on one of the mount plate of the tablet computer and the second side of the docking sled, and at least one second magnet on the other one of the mount plate of the tablet computer and the second side of the docking sled, wherein the first magnet and the second magnet correspond to each other and have opposite poles.

11. The electrical assembly according to claim 8, wherein the angle is about 180°.

12. The electrical assembly according to claim 1, wherein when the docking sled is electrically connected to the main body, the main body provides charging power to the docking sled and there is bi-directional communication between the docking sled and the main body.

13. The electrical assembly according to claim 1, wherein the mobile device is a payment device.

14. The electrical assembly according to claim 1, wherein when the mobile device is electrically connected to the docking sled, the docking sled provides charging power to the mobile device and there is bi-directional communication between the docking sled and the mobile device.

15. The electrical assembly according to claim 1, wherein the first side of the docking sled is open so that the mobile device is accessible from the open first side when it is received within the docking sled.

* * * * *